United States Patent
Nourrcier et al.

(10) Patent No.: US 6,842,231 B2
(45) Date of Patent: Jan. 11, 2005

(54) METHOD FOR IMPROVED RANGE ACCURACY IN LASER RANGE FINDERS

(75) Inventors: Charles E. Nourrcier, Long Beach, CA (US); Karen D. Wirtz, Long Beach, CA (US); Stanley D. Brown, Redondo Beach, CA (US); Colin N. Sakamoto, Redondo Beach, CA (US); Angela K. Martinez, Pacific Palisades, CA (US); Scott C. Johnson, Torrance, CA (US)

(73) Assignee: Raytheon Company, Lexington, MA (US)

( * ) Notice: Subject to any disclaimer, the term of this patent is extended or adjusted under 35 U.S.C. 154(b) by 112 days.

(21) Appl. No.: 10/260,736

(22) Filed: Sep. 30, 2002

(65) Prior Publication Data

US 2004/0066501 A1 Apr. 8, 2004

(51) Int. Cl.[7] .................................................. G01C 3/08
(52) U.S. Cl. ...................................................... 356/5.01
(58) Field of Search ................................. 356/4.01–5.1

(56) References Cited

U.S. PATENT DOCUMENTS

| | | | | |
|---|---|---|---|---|
| 5,574,552 A | * | 11/1996 | Dunne ........................ 356/5.05 |
| 5,726,742 A | * | 3/1998 | Nourrcier ................... 356/5.01 |
| 5,923,428 A | * | 7/1999 | Woodworth ................. 356/623 |
| 5,926,259 A | * | 7/1999 | Bamberger et al. ......... 356/5.01 |
| 6,310,682 B1 | * | 10/2001 | Gavish et al. .............. 356/5.01 |
| 6,339,740 B1 | * | 1/2002 | Seto et al. ...................... 701/96 |
| 6,392,747 B1 | * | 5/2002 | Allen et al. ............... 356/141.1 |

* cited by examiner

*Primary Examiner*—Don Wong
*Assistant Examiner*—Phillip Nguyen
(74) *Attorney, Agent, or Firm*—Renner, Otto, Boisselle & Sklar, LLP

(57) ABSTRACT

The range of a threshold detection laser range finder is increased by adding a low cost Analog-to-Digital converter and sampling a portion of a reflected laser pulse. The slope of the sampled reflected laser pulse is calculated and the shape of the reflected laser pulse is inferred from known shapes. The center point of the inferred shape is approximated using a lookup table, and a correction value is calculated based on the center point of the inferred shape and the sampled portion. The correction value is applied to an uncorrected range estimate to arrive at an accurate estimate of the range of the object of interest.

25 Claims, 4 Drawing Sheets

| Peak(V) | T(th) | V(+5nS) | V(+10nS) | Uncorrected Range Error |
|---|---|---|---|---|
| 1 | 5 | 12 | 77 | 4 |
| 0.75 | 5.5 | 11 | 70 | 4 |
| 0.5 | 6 | 9.5 | 53 | 4 |
| 0.25 | 8 | 9 | 46 | 3.5 |
| 0.125 | 9 | 7 | 30 | 3.3 |
| .0625 | 11 | 6.6 | 23 | 3 |
| .02 | 14 | 4.7 | 12 | 2.5 |
| .01 | 16 | 3.7 | 7.8 | 2.25 |
| .005 | 18 | 2.6 | 4.6 | 2 |
| .001 | 31 | .85 | .45 | 0 |

Fig. 3

METHOD FOR IMPROVED RANGE ACCURACY IN LASER RANGE FINDERS

FIELD OF THE INVENTION

The present invention relates to range detection, and more specifically to a more accurate laser range finder.

BACKGROUND OF THE INVENTION

Range finders based on laser techniques have been successfully developed as disclosed in U.S. Pat. Nos. 5,359,404, 5,612,779, and 5,574,552 granted to Laser Tech Co. A laser range finder employs a laser diode as its light source and can accurately determine the range of an object of interest at distances in excess of 1 Km. While laser range finders have found their way into numerous applications, they have proven to be extremely useful in military applications. In fact, laser range finders have been developed that are accurate to several meters of an object of interest.

A typical laser range finder includes a laser source, a laser receiver and a processor. In estimating the range of an object of interest, the laser source is directed at the object of interest and a series of laser pulses are emitted. The pulses strike the object of interest and are reflected. At least a portion of the reflected pulses travel back towards the laser range finder and are detected by the laser receiver. The detected pulses are provided to the processor, which then processes the detected pulses so as to estimate the distance between the laser range finder and the object of interest.

Presently, existing laser range finders have obtained accuracies within ±5 meters of an object of interest. There exists, however, a need for a laser range finder having better accuracies than are currently achievable. In particular, the military is requiring accuracies within ±3 meters. Moreover, these improved laser range finders must meet the weight and power constraints of the existing system architecture.

One proposed approach to improving the accuracy of existing laser range finders is to implement a low cost Analog-to-Digital Converter (hereinafter "ADC") within the existing system architecture. The ADC is used to obtain an estimate of the reflected laser pulse signal intensity, which is then used to correct for range errors due to threshold detection. A drawback to this approach, however, is that since the target return intensities are unknown, due in part to the Gaussian structure of the pulses emitted by conventional laser sources, utilizing existing processing techniques would result in the need to employ an ADC with a very large dynamic range or several ADC's scaled to cover the range of potential intensities of the reflected laser pulses. An ADC with a large dynamic range will add significant cost to the system. Multiple ADC's present cost, power consumption and weight issues. Accordingly, neither approach meets the objectives described above.

Therefore, there is a need in the art to develop an enhanced laser range finder that improves range accuracy and performs within the design constraints of existing laser range finders. More particularly, there is a need in the art to develop a laser range finder that can employ a single low cost ADC, which can be used to effectively estimate the intensity of the reflected laser pulses, thereby enabling an accurate range calculation of an object of interest.

SUMMARY OF THE INVENTION

In the light of the foregoing, one aspect of the invention relates to a laser range finder for determining a range of an object of interest. The laser range finder includes a laser source for generating a plurality of laser pulses and for directing the plurality of laser pulses toward the object of interest. The laser range finder also includes a laser receiver for receiving a plurality of reflected laser pulses, wherein the laser receiver generates a signal indicative of the reflected laser pulses. A processor is operatively coupled to the laser source and the laser receiver. The processor includes an Analog-to-Digital Converter for sampling a portion of the signal.

A second aspect of the invention relates to a method for increasing the range of a laser range finder. The method includes the steps of pulsing a laser at an object of interest. A range counter begins counting at the initiation of the laser pulse, the range counter accumulating an uncorrected range value. Reflected laser pulses are detected and a signal is generated indicative of the reflected laser pulse. The uncorrected range value is latched when the signal exceeds a predetermined threshold level. A shape of the reflected laser pulse is inferred from a portion of the signal, and a range correction value is calculated from the shape of the reflected laser pulse. The correction value is applied to the latched uncorrected range value to obtain the range of the object of interest.

Other aspects, features, and advantages of the invention will become apparent from the following detailed description. It should be understood, however, that the detailed description and specific examples, while indicating several preferred embodiments of the present invention, are given by way of illustration only and various modifications may naturally be performed without deviating from the present invention.

BRIEF DESCRIPTION OF THE DRAWINGS

FIG. 3 shows the variation in peak reflected voltage based on visibility, range distance, reflectivity of range, and other atmospheric conditions.

DETAILED DESCRIPTION OF THE INVENTION

Figure 1:
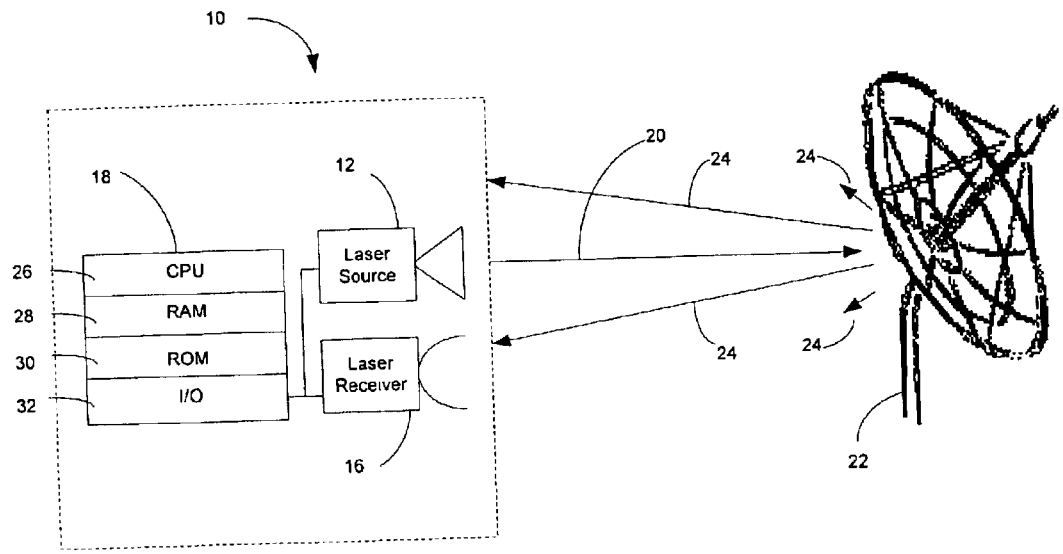
FIG. 1 is an overview of a laser range finder of the present invention.

In the detailed description that follows, identical components have been given the same reference numerals, regardless of whether they are shown in different embodiments of the present invention. To illustrate the present invention in a clear and concise manner, the drawings may not necessarily be to scale and certain features may be shown in schematic form.

Referring first to FIG. 1, an overview of a laser range finder 10 is shown. The laser range finder 10 includes a laser source 12, a laser receiver 16 and a processor 18. The laser source 12 generates laser pulses 20 that are directed towards an object of interest 22. The object of interest 22 may be any object for which an estimate of range is desired, such as, for example, a communications satellite dish, a building, a vehicle, a person, etc. Ideally, a portion of the laser pulses 20 are reflected from the object of interest 22 towards the laser range finder 10. The laser receiver 16 of the laser range finder 10 detects the reflected laser pulses 24 and provides data regarding the reflected pulses 24 to the processor 18 for processing.

The processor 18 is electrically connected or coupled to the laser source 12 and the laser receiver 16. The processor 18 generally includes a CPU 26, a RAM 28, a ROM 30, and various I/O points 32. In addition to the data received from the laser receiver 16, the processor 18 also receives data from the laser source 12. The processor uses the data from both the laser source 12 and the laser receiver 16 to estimate the range of the object of interest 22.

Figure 2:
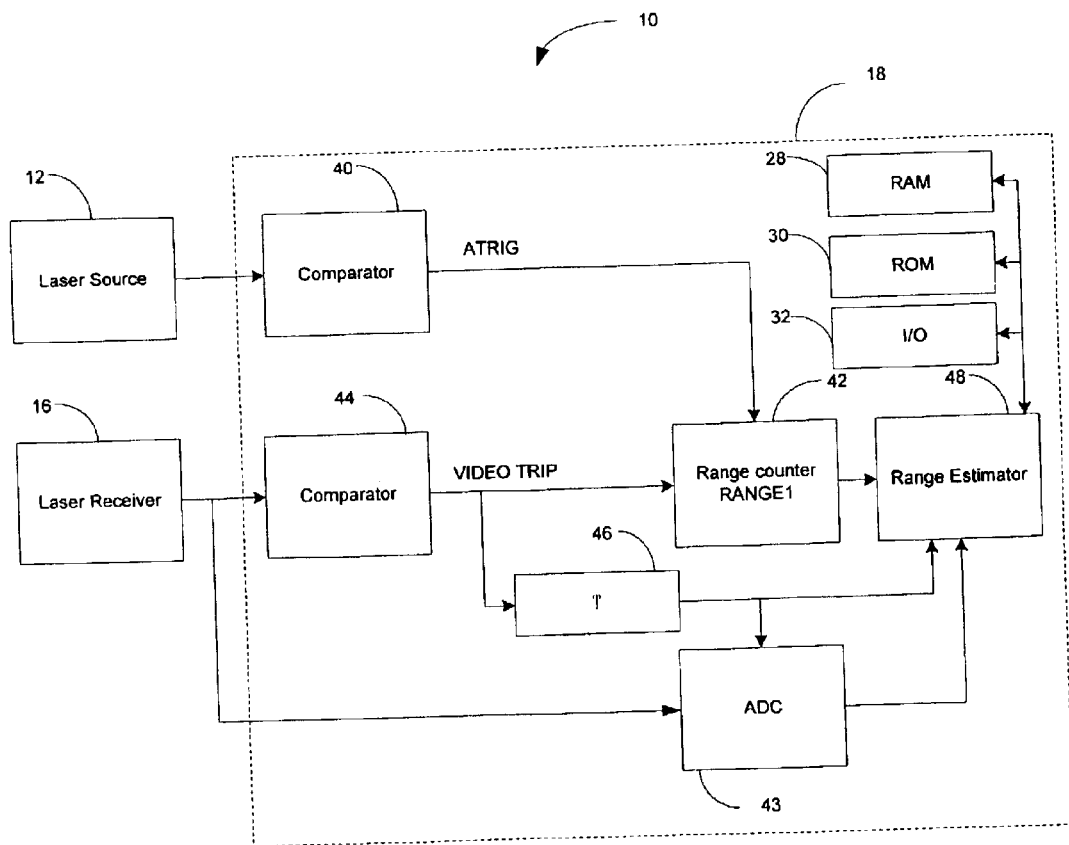
FIG. 2 is a block diagram of a laser range finder of the present invention.

Referring now to FIG. 2, a block diagram of the laser range finder 10 is presented, which provides more detail in connection with the processor 18. The laser source 12 is coupled to a comparator 40 of the processor 18. The laser source 12 provides a signal to the comparator 40 which indicates to the processor 18 that a laser pulse 20 has been emitted. In response to receiving the signal from the laser source 12, the comparator 40 sets a status bit, and provides the status bit to a range counter 42 for use in further processing. The status bit set by the comparator 40 will hereinafter be referred to as "ATRIG".

The laser receiver 16 is coupled both to the processor 18 and an Analog-to-Digital Converter or ADC 43. Upon detecting a reflected laser pulse 24, the laser receiver 16 generates a signal proportional to the strength of the reflected laser pulse 24. For example, the laser receiver 16 may generate an analog signal, ranging in amplitude from 0–10 volts, in which a "strong" signal would be represented by a voltage in the upper range of the scale, e.g. near 10 volts, and a weak signal would be represented by a voltage in the lower range of the scale, e.g. near 0 volts. The signal generated by the laser receiver 16 is provided to the processor 18. A second comparator 44 in the processor 18 monitors the signal generated by the laser receiver 16 to determine when a reflected laser pulse 24 is present that exceeds a predefined threshold level. Upon detecting a reflected laser pulse 24 exceeding the predefined threshold, the comparator 44 sets a status bit, which is provided to the range counter 42 for further processing. The status bit set by the second comparator 44 will be referred to as "VIDEOTRIP".

The range counter 42 monitors the status bits ATRIG and VIDEOTRIP. The range counter 42 begins counting upon receiving the ATRIG signal from the comparator 40 and continues counting until it receives the VIDEOTRIP signal from the comparator 44. The value accumulated within the range counter during this period is an uncorrected or raw range value of the distance of the object of interest 22. In other words, the count accumulated is proportional to the distance from the laser range finder 10 to the object of interest 22. High count values represent a large distance, while small count values represent a short distance.

The status bit VIDEOTRIP also is provided to a time delay function 46, which has a time delay τ. The time delay function 46 is an "on delay" timer and is well known by those skilled in the art. Briefly, an on delay timer generates a TRUE or logic 1 output a preset time delay after it has received a TRUE or logic 1 input. For example, the time delay function 46 will generate a TRUE or logic 1 τ seconds after receiving the status bit VIDEOTRIP. Therefore, in the present invention, the output of the time delay function 46 is equivalent to the output of the comparator 44, but shifted in time by τ seconds. The output of the time delay function 46 is operatively coupled to a range estimator 48 and the ADC 43, the functions of which will be discussed in more detail below.

The ADC 43 receives the analog signal generated by the laser receiver 16. In the present embodiment of the invention, the ADC 43 converts the analog signal into a digital representation and outputs the digital representation to the range estimator 48 upon receiving the output of the time delay function 46. The time delay τ of the time delay function 46 is set based on the characteristics of the ADC 43 employed in the system. Typical values for τ are between 5–10 nsec, but alternate values may be required depending on the specific ADC 43 used in the system. Alternatively, the delay time τ may be adjustable.

Referring now to FIG. 3, simulation results for the derivation of the time delay τ and the dynamic requirements of the ADC are illustrated. The first column, Peak(V), represents various peak voltages of the reflected laser pulse 24. The peak voltage of the peak reflected laser pulse 24 varies based on visibility, range distance, reflectivity of range, and other atmospheric conditions. The second column, T(th), is the threshold crossing time for the corresponding peak voltage. As can be seen from the data, the threshold crossing occurs at a different time for each peak voltage. The third and fourth column detail the voltage levels of the reflected laser pulse a fixed time delay (5 nsec and 10 nsec) after the signal crosses the threshold voltage, and the fifth column presents the uncorrected range error for each corresponding peak voltage. Using these simulation results, for example, the dynamic range and resolution requirements of the ADC may be determined.

Figure 4:
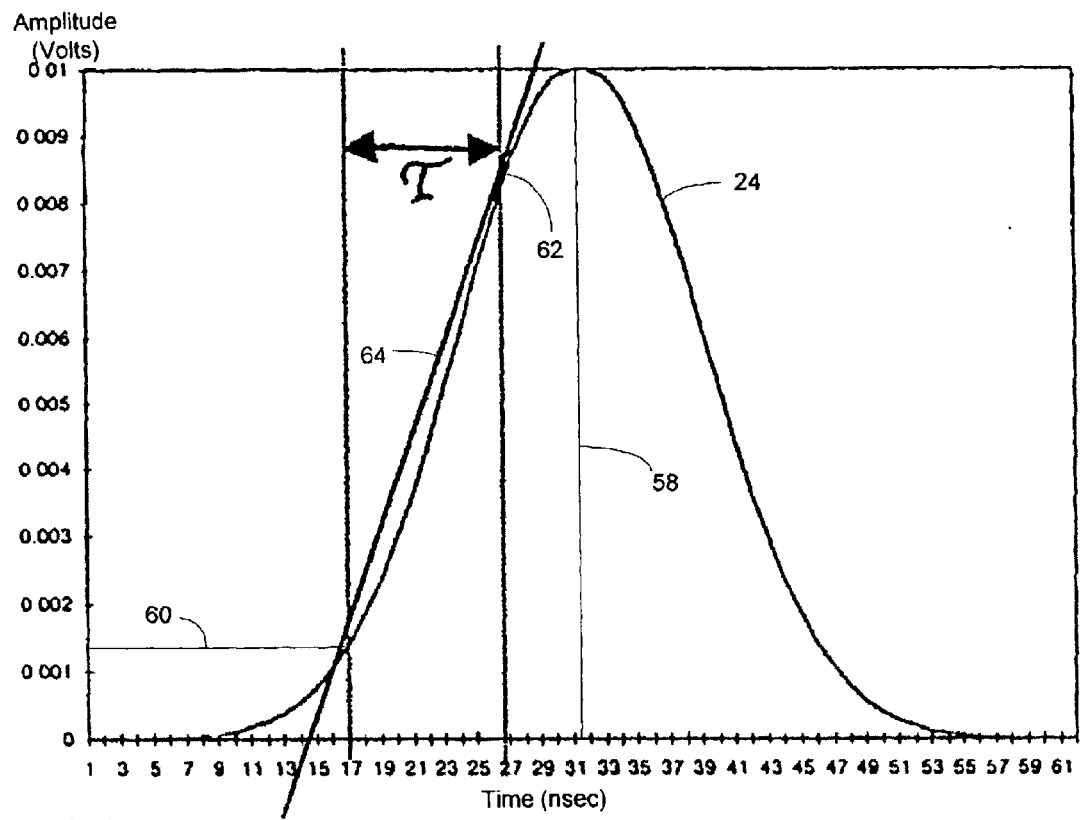
FIG. 4 illustrates that the shape of the laser can be determined from the delayed return sample.

Turning to FIG. 4, in order to obtain an accurate range of the object of interest 22, the range counter 42 ideally should stop counting at the center point 58 of the reflected laser pulse 24. Unfortunately, in order to determine where the center point 58 of the reflected laser pulse 24 occurs the entire reflected laser pulse 24 would need to be sampled. As was discussed previously, if required to sample the entire reflected laser pulse 24, the ADC 43 must have a very large dynamic range or multiple ADC's must be implemented. Due to the cost and power constraints, such an implementation is not feasible.

To negate the need to sample the entire reflected pulse, the shape of the reflected laser pulse 24 may be inferred by sampling a portion of the reflected laser pulse signal. More specifically, the shape of the reflected laser pulse 24 may be inferred by calculating a slope of the sampled portion of the reflected laser pulse signal. Once the slope is calculated, the shape may be inferred from a plurality of known slopes and corresponding shapes that are stored in memory, e.g., ROM 30. A range correction value may be determined from the inferred shape and applied to the uncorrected range value, which is discussed in more detail below.

As was mentioned previously, to estimate properly the range of the object of interest 22, the range counter 42 should stop counting at the center point 58 of the reflected laser pulse 24. The range counter 42, however, stops counting after the reflected laser pulse 24 crosses the preset threshold, which is not at the center point 58 of the reflected laser pulse 24. Accordingly, in order to arrive at an accurate range estimate of the object of interest 22, the difference between where the range counter 42 stopped counting (the preset threshold) and where it should have stopped counting (the center point 58) must be taken into consideration. This may be achieved by approximating the center point 58 of the reflected laser pulse 24 and generating a correction value which is applied to the uncorrected range value.

In the present embodiment of the invention, the processor 18 approximates the center point 58 of the reflected laser pulse 24 by accessing a lookup table based on the inferred shape of the reflected pulse 24. Again, the lookup table is stored in memory (ROM 30), and contains information regarding the center points of a plurality of known reflected laser pulses. Using the approximated center point 58 and the delayed sample 62, the processor 18 calculates a correction value, which is applied to the uncorrected range value to obtain an accurate estimate of the range of the object of interest 22.

Figure 5:
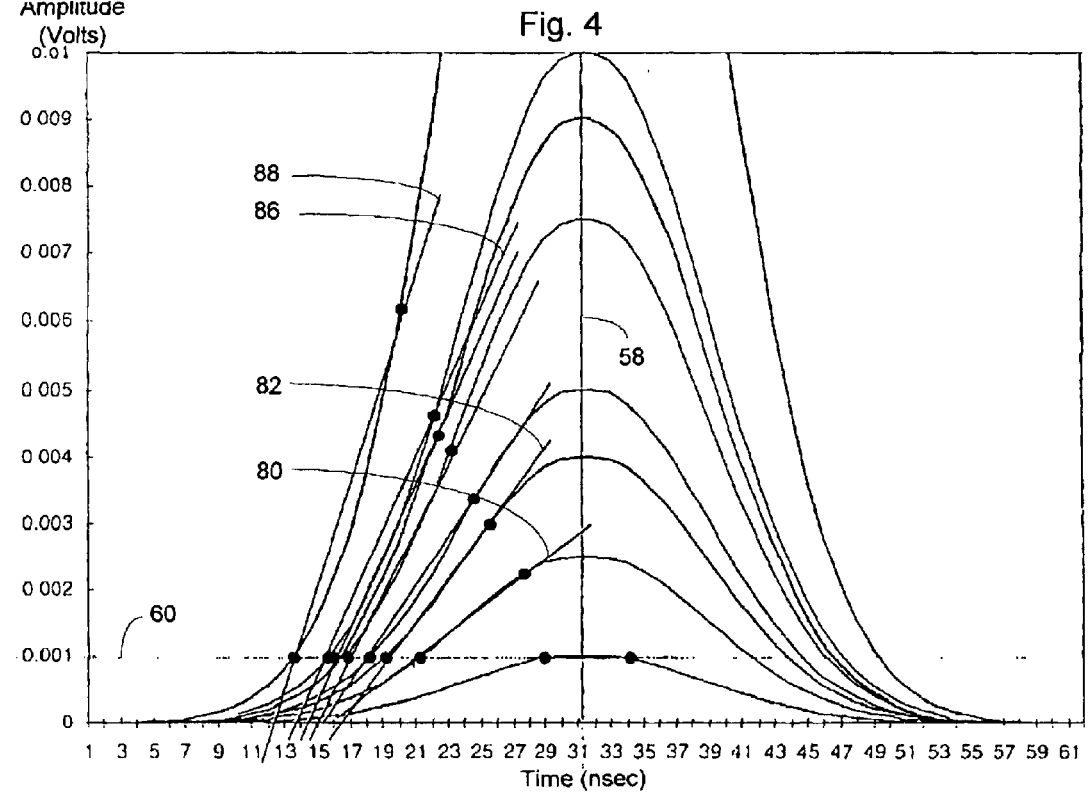
FIG. 5 illustrates the different shapes that can be determined from various delayed return samples.

Following is an illustrative example of the embodiment described above, including a detailed description of the processor 18 operation. Referring to FIG. 4, a predefined threshold 60 is set slightly higher than the noise in the surrounding environment. If the voltage signal of the reflected laser pulse 24 is equal to or greater than the threshold 60, then the second comparator 44 triggers, thus setting VIDEOTRIP to TRUE (logic 1). The time delay function 46, seeing that VIDEOTRIP is TRUE, begins timing and after $\tau$ seconds sets its output to TRUE (logic 1). The ADC 43 receives the output of the time delay function 46 and proceeds to sample the output of the laser receiver 16. The value read by the ADC 43 is referred to as the delayed sample 62. Using the threshold 60 and the delayed sample 62, a slope 64 may be calculated using the equation $(V_{62}-V_{60})/\tau$, where $V_{62}$ is the amplitude of the delayed sample 62, $V_{60}$ is the amplitude of the threshold 60, and $\tau$ is the time delay of the time delay function 46. Based on the calculated slope 64, the processor 18 infers the shape of the reflected laser pulse 24 based on a plurality of known slopes and corresponding shapes, which are stored in memory. FIG. 5 illustrates some different slopes that may be obtained by sampling the reflected laser pulse 24 a preset time period after crossing the threshold 60. These slopes may be used to infer the type of reflected laser pulse 24 that has been detected. Steep slopes (e.g. 86, 88) indicate a close, more reflective return. Flat slopes (e.g. 80, 82) indicate a further, less reflective return.

After inferring the shape of the reflected laser pulse 24, the processor, based on the inferred shape, accesses a lookup table to approximate the center point 58 of the inferred shape. Using the center point 58 and the delayed sample point 62, the processor calculates a range correction value based on a priori knowledge stored in memory relating to measured slope versus estimated center point 58. The range correction value is applied to the uncorrected range value to obtain an accurate estimate of the range of the object of interest 22.

Figure 6:
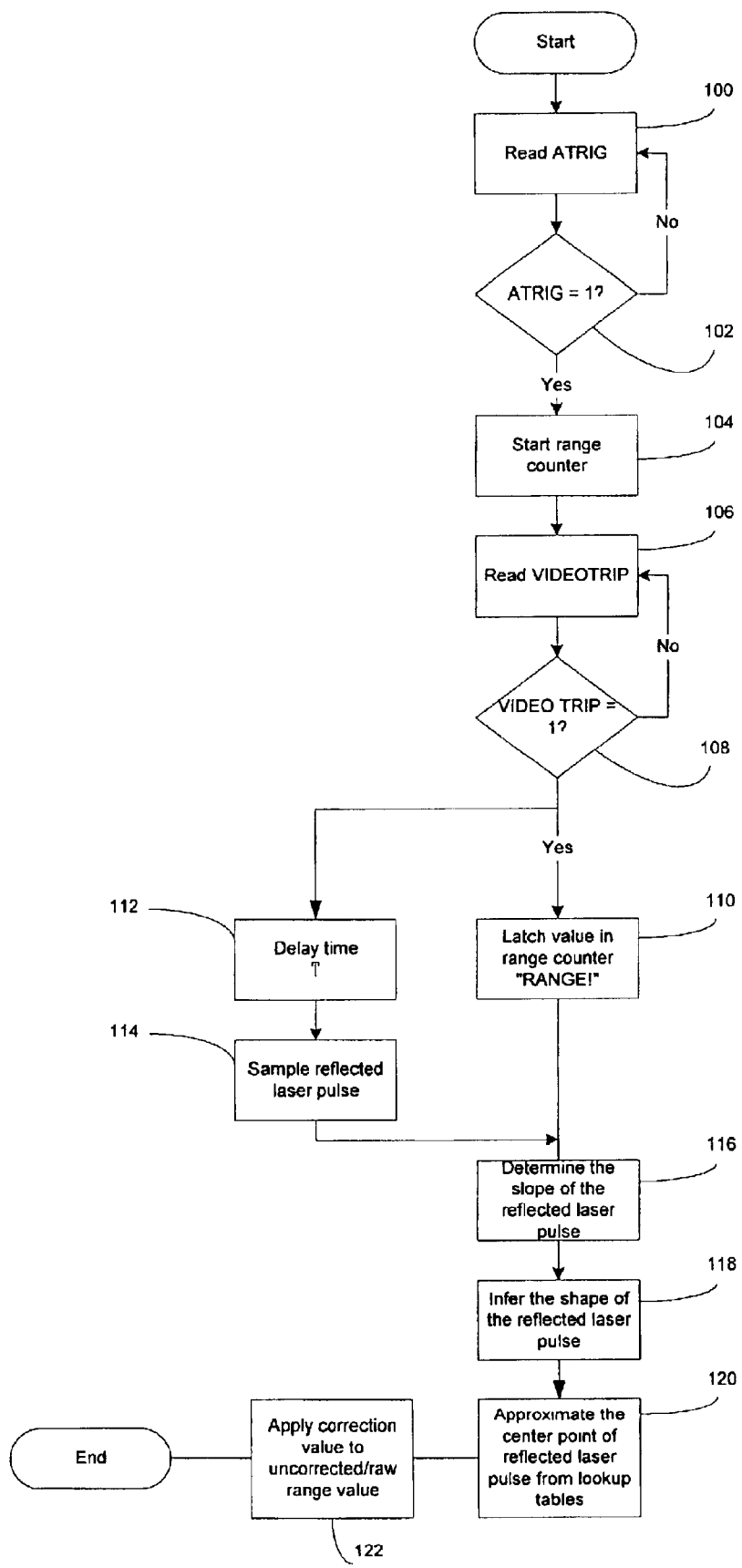
FIG. 6 is a functional block diagram illustrating the operational steps employed by a laser range finder in accordance with the present invention.

Referring to FIG. 6, a flow chart illustrating the operation of the present invention is provided. Beginning at step 100, the processor 18 reads the output of the comparator 40, i.e. the status bit "ATRIG". Since the comparator 40 sets its output high (e.g. logic 1) upon detecting a signal from the laser source 12 indicating that the laser source 12 has emitted the laser pulse 20, the processor 18 checks the value of ATRIG to determine whether a laser pulse 20 has been emitted. As is indicated in step 102, if ATRIG is FALSE (logic 0), then the processor 18 recognizes that a laser pulse 20 has not been emitted and returns to step 100. On the other hand, if ATRIG is TRUE (logic 1), then the processor 18 recognizes that a laser pulse 20 has been emitted and sends a signal to the range counter 42 to commence counting (see step 104).

Moving now to step 106, the processor 18 also reads the value of the comparator 44, i.e. the status bit "VIDEOT-RIP". As was discussed above, the comparator 44 will set VIDEOTRIP to a "1" upon detecting a signal from the laser receiver 16 that is greater than a predetermined threshold 60. At step 108, the processor 18 monitors the value of VIDEOTRIP and if VIDEOTRIP is FALSE (logic 0), a reflected laser pulse 24 has not been detected and the processor 18 moves back to step 106 and continues monitoring. If, however, VIDEOTRIP is TRUE (logic 1), a reflected laser pulse 24 that exceeds the predetermined threshold has been detected and the processor 18 simultaneously executes steps 110 and 112. In step 110, the processor 18 latches the value in the range counter 42, which is the uncorrected/raw range value and is referred to as "RANGE1". In step 112, the processor 18 starts the time delay function 46. As was discussed previously, the time delay function 46 will trigger an output equivalent to its input, but $\tau$ seconds later. When the output of the time delay function 46 becomes TRUE (logic 1), the ADC 43 samples the reflected laser pulse signal from the laser receiver 16, as shown in step 114.

Moving to step 116, as the time delay function 46 of step 112 triggers, the processor 18 uses the latched value RANGE1 of the range counter 42 from step 110 and the value sampled by the ADC 43 at step 114 to accurately calculate the range of the object of interest 22. The processor 18 first determines the slope of the reflected laser pulse 24, which is calculated using the preset threshold 60 used by the comparator 44 to trigger VIDEOTRIP as the first point, and the value sampled from the ADC 43 at step 114 as the second point. Based on the calculated slope, a shape of the reflected laser pulse 24 is inferred, as is indicated in step 118. As was discussed above, the shape is inferred from the known slopes of reflected laser pulses 24. Based on the inferred shape, the processor 18 accesses a lookup table to approximate the center point 58 of the reflected laser pulse 24 (see step 120). Moving to step 122, after the processor 18 has approximated the center point 58 of the reflected laser pulse 24, it calculates a correction value and applies the correction value to the uncorrected range value.

While particular embodiments of the invention have been described in detail, it is understood that the invention is not limited correspondingly in scope, but includes all changes, modifications and equivalents coming within the spirit and terms of the claims appended hereto.

What is claimed is:

1. A laser range finder for determining a range of an object of interest, comprising:

a laser source for generating a plurality of laser pulses and for directing the plurality of laser pulses toward the object of interest;

a laser for detecting a reflected laser pulse, and generating an analog signal representative of a shape of the laser pulse;

an analog-to digital converter for converting a portion of the analog signal into a digital signal; and a processor for inferring a shape of the reflected laser pulse from the digital signal, calculating a range correction value from the inferred shape of the reflected laser pulse, and applying the range correction value to an uncorrected range value to obtain the range of the object of interest.

2. A laser range finder in accordance with claim 1, wherein the signal is proportional to the strength of the reflected laser pulse.

3. A laser range finder in accordance with claim 1, wherein the processor calculates a slope from the sampled portion of the signal.

4. A laser range finder in accordance with claim 3, wherein the slope is calculated from a first point and a second point, the first point being a predetermined threshold level, and the second point being sampled a predetermined delay after the magnitude of the signal exceeds the first point.

5. A laser range finder in accordance with claim 4, further comprising a memory.

6. A laser range finder in accordance with claim 5, wherein a shape of the reflected laser pulse is inferred from the slope and from a plurality of known slopes of reflected laser pulse shapes.

7. A laser range finder in accordance with claim 6, wherein the plurality of known slopes of reflected pulses are stored in the memory.

8. A laser range finder in accordance with claim 7, wherein the memory is ROM.

9. A laser range finder in accordance with claim 6, wherein a center point of the shape of the reflected laser pulse is approximated based on the inferred shape.

10. A laser range finder in accordance with claim 9, wherein the center point is approximated from a lookup table.

11. A laser range finder in accordance with claim 10, wherein the lookup table is stored in memory.

12. A laser range finder in accordance with claim 11, wherein the memory is ROM.

13. A laser range finder in accordance with claim 10, wherein a range correction value is determined from a distance between the second point and the center point of the shape of the reflected laser pulse.

14. A laser range finder in accordance with claim 13, wherein the predetermined delay is adjustable.

15. A method for calculating the range of an object using a laser range finder, comprising the steps of:

pulsing a laser at an object of interest;

starting a range counter at the initiation of the laser pulse, the range counter accumulating an uncorrected range value;

detecting a reflected laser pulse;

generating a signal indicative of the reflected laser pulse;

latching the uncorrected range value when the signal exceeds a predetermined threshold level;

inferring a shape of the reflected laser pulse from a portion of the signal;

calculating a range correction value from the shape of the reflected laser pulse; and applying the range correction value to the latched uncorrected range value to obtain the range of the object of interest.

16. A method in accordance with claim 15, wherein the shape of the reflected laser pulse is inferred from a slope of the signal and from a plurality of known slopes of reflected laser pulse shapes.

17. A method in accordance with claim 16, wherein the slope is calculated from a first point and a second point, the first point being the predetermined threshold level, and the second point being a delayed sample of the signal.

18. A method in accordance with claim 17, wherein a center point of the shape of the reflected laser pulse is approximated from a lookup table.

19. A method in accordance with claim 18, wherein the range correction value is calculated from the center point and the delayed sample of the signal.

20. A laser range finder for determining a range of an object of interest, comprising:

a laser source for pulsing a laser at an object of interest;

a range counter started at the initiation of the laser pulse, the range counter accumulating an uncorrected range value;

a laser receiver for detecting a reflected laser pulse;

generating a signal indicative of the reflected laser pulse; and latching the uncorrected range value when the signal exceeds a predetermined threshold level; and a processor for inferring a shape of the reflected laser pulse from a portion of the signal, calculating a range correction value from the shape of the reflected laser pulse, and applying the range correction value to the latched uncorrected range value to obtain the range of the object of interest.

21. A method for calculating the range of a laser range finder, comprising the steps of:

pulsing a laser at an object of interest;

detecting a reflected laser pulse;

generating an analog signal representative of a shape of the reflected laser pulse;

converting a portion of the analog signal into a digital signal;

inferring a shape of the reflected laser pulse from the digital signal;

calculating a range correction value from the inferred shape of the reflected laser pulse; and applying the range correction value to an uncorrected range value to obtain the range of the object of interest.

22. The method in accordance with claim 21, further comprising the step of calculating a slope of the reflected laser pulse from the digital signal.

23. A method in accordance with claim 22, wherein the slope is calculated from a first point and a second point, the first point being the predetermined threshold level, and the second point being a delayed sample of the signal.

24. A method in accordance with claim 22, wherein a center point of the shape of the reflected laser pulse is approximated from a lookup table.

25. A method in accordance with claim 21, wherein the range correction value is calculated using the center point of the inferred shape and the delayed sample of the signal.

* * * * *